(12) United States Patent
Sato et al.

(10) Patent No.: US 9,901,900 B2
(45) Date of Patent: Feb. 27, 2018

(54) GAS-ADSORBING MATERIAL AND VACUUM INSULATION MATERIAL INCLUDING THE SAME

(71) Applicant: Samsung Electronics Co., Ltd., Suwon-si, Gyeonggi-do (KR)

(72) Inventors: Nagahisa Sato, Yokohama (JP); Ryosuke Kamitani, Yokohama (JP); Kenichi Nagayama, Yokohama (JP)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 41 days.

(21) Appl. No.: 14/939,892

(22) Filed: Nov. 12, 2015

(65) Prior Publication Data
US 2016/0136612 A1    May 19, 2016

(30) Foreign Application Priority Data

Nov. 13, 2014  (JP) ................... 2014-230823
Apr. 21, 2015  (KR) ............. 10-2015-0056034
Jul. 9, 2015   (JP) ................... 2015-138163

(51) Int. Cl.
    *B01J 20/18*    (2006.01)
    *B01D 53/02*    (2006.01)
    (Continued)

(52) U.S. Cl.
    CPC ........... *B01J 20/186* (2013.01); *B01D 53/02* (2013.01); *B01D 53/0407* (2013.01);
    (Continued)

(58) Field of Classification Search
    CPC ..................................................... B01J 20/186
    See application file for complete search history.

(56) References Cited

U.S. PATENT DOCUMENTS 4,570,027 A * 2/1986 Boucher ............... B01J 29/084
                                              502/79
5,242,676 A * 9/1993 Apelian ................. B01J 29/40
                                              423/714
(Continued)

FOREIGN PATENT DOCUMENTS

CN         101163544 A       4/2008
EP          0769117 A1       4/1997
(Continued)

*Primary Examiner* — Melvin C. Mayes
*Assistant Examiner* — Stefanie J Cohen
(74) *Attorney, Agent, or Firm* — Harness, Dickey & Pierce, P.L.C.

(57) ABSTRACT

A gas-adsorbing material may increase gas barrier properties for a target gas by reducing a gas-adsorption rate while maintaining gas-adsorption performance. A vacuum insulation material may use the gas-adsorbing material. The gas-adsorbing material may include a gas-adsorbing composition including a copper ion exchanged ZSM-5-type zeolite having a silica to alumina ratio ranging from about 10 to 50 in a framework of zeolite. A ratio of dealuminization of the ZSM-5-type zeolite is at least about 15%, and the gas-adsorbing material is capable of adsorbing at least nitrogen. Furthermore, the gas-adsorbing material may include a calcinated body of a compressed article comprising a gas-adsorbing composition including a copper ion exchanged ZSM-5-type zeolite having a silica to alumina ratio ranging from about 10 to 50 in a framework of zeolite (where a ratio of dealuminization of the ZSM-5-type zeolite is at least about 15%) and a moisture-absorbing material.

12 Claims, 2 Drawing Sheets

(51) Int. Cl.
  *B01J 20/28* (2006.01)
  *B01D 53/04* (2006.01)
  *F16L 59/065* (2006.01)

(52) U.S. Cl.
  CPC ....... *B01J 20/28011* (2013.01); *F16L 59/065* (2013.01); *B01D 2253/1085* (2013.01); *B01D 2253/1122* (2013.01); *B01D 2257/102* (2013.01); *B01D 2257/104* (2013.01); *B01D 2257/80* (2013.01)

(56) References Cited

U.S. PATENT DOCUMENTS

| | | | |
|---|---|---|---|
| 5,544,490 | A | 8/1996 | Manini et al. |
| 8,158,547 | B2 | 4/2012 | Yuasa et al. |
| 8,575,054 | B2 | 11/2013 | Ikoma et al. |
| 8,716,162 | B2 | 5/2014 | Kikuchi et al. |
| 8,776,718 | B2 | 7/2014 | Park et al. |
| 9,105,849 | B2 | 8/2015 | Park et al. |
| 2008/0038160 | A1 | 2/2008 | Kil et al. |
| 2011/0105819 | A1* | 5/2011 | Vasiliev .................. B01J 20/18 585/481 |
| 2011/0237423 | A1 | 9/2011 | Kikuchi et al. |
| 2013/0305928 | A1 | 11/2013 | Kojima et al. |
| 2013/0306655 | A1* | 11/2013 | Takushima ......... B01D 53/0407 220/592.25 |
| 2014/0124992 | A1 | 5/2014 | Kikuchi et al. |
| 2014/0166926 | A1 | 6/2014 | Lee et al. |

FOREIGN PATENT DOCUMENTS

| | | |
|---|---|---|
| EP | 1908515 A1 | 4/2008 |
| EP | 2676714 A1 | 12/2013 |
| JP | 3008341 B2 | 2/2000 |
| JP | 3105542 B2 | 11/2000 |
| JP | 2003311148 A | 11/2003 |
| JP | 3693626 B2 | 9/2005 |
| JP | 2006043604 A | 2/2006 |
| JP | 4385970 B2 | 12/2009 |
| JP | 4671897 B2 | 4/2011 |
| JP | 4734865 B2 | 7/2011 |
| JP | 2011200789 A | 10/2011 |
| JP | 4807552 B2 | 11/2011 |
| JP | 4887658 B2 | 2/2012 |
| JP | 2012217942 A | 11/2012 |
| KR | 100210110 B1 | 7/1999 |
| KR | 20070122505 A | 12/2007 |
| KR | 100892483 B1 | 4/2009 |
| KR | 20110088052 A | 8/2011 |
| KR | 101126063 B1 | 3/2012 |
| KR | 101360474 B1 | 2/2014 |
| WO | WO 2012111311 A1 * | 8/2012 ......... B01D 53/0407 |

* cited by examiner

GAS-ADSORBING MATERIAL AND VACUUM INSULATION MATERIAL INCLUDING THE SAME

CROSS-REFERENCE TO RELATED APPLICATIONS

This application claims priority under 35 U.S.C. § 119 to Japanese Patent Application Nos. 2014-230823, and 2015-138163, filed in the Japanese Patent Office on Nov. 13, 2014, and Jul. 9, 2015, respectively, and Korean Patent Application No. 10-2015-0056034, filed in the Korean Intellectual Property Office on Apr. 21, 2015, the entire contents of each of which are incorporated herein by reference.

BACKGROUND

1. Field

Example embodiments relate to a gas-adsorbing material and a vacuum insulation material using the gas-adsorbing material. The gas-adsorbing material may be used in various fields in which a vacuum is maintained, such as for removing trace gases, a gas in a fluorescent lamp, and the like.

2. Description of the Related Art

There has been increasing interest in a vacuum insulation material having improved insulating effects for electronic appliances, machinery, and equipment in order to conserve energy. A vacuum insulation material may be manufactured by covering a core material having micropores (such as glass wool, silica powder, or the like) with an exterior material having gas barrier properties, and then sealing the inside of the exterior material under a reduced pressure. To maintain the improved insulating effect of the vacuum insulation material for a relatively long period of time, adsorbing materials for removing an aqueous vapor or gas (such as oxygen, nitrogen, and the like) that infiltrates into the vacuum insulation material are sealed with the core material in the vacuum insulation material under a reduced pressure.

Among the adsorbing materials, a chemically adsorbing material irreversibly fixing and adsorbing moisture may be appropriate for the vacuum insulation material. One example of such a moisture adsorbing material is calcium oxide (CaO). However, a moisture adsorbing material such as the calcium oxide may not adsorb oxygen and nitrogen which may permeate through the exterior material of the vacuum insulation material from the air.

A metallic material formed of a barium getter or a ternary alloy of zirconium-vanadium-iron may be used as an adsorbing material capable of adsorbing oxygen or nitrogen. However, these adsorbing materials need to be activated at a relatively high temperature of greater than or equal to about 400° C. under a reduced pressure environment. To complicate matters, such adsorbing materials should not be heated, because the reduced pressure environment is set by using an exterior material by multi-layering a plastic film and a metal foil, and the exterior material may be molten and broken.

An adsorbing material used to remove an impurity gas such as nitrogen from a purifying subject gas may be a ZSM-5-type zeolite where a copper ion is exchanged (e.g., a vacuum insulation material where copper ions are introduced into a ZSM-5-type zeolite by a conventional ion exchange method and a heat treatment is performed to activate nitrogen adsorption activity).

However, moisture essentially coexists in an insulation structure such as vacuum insulation material. In copper ion exchanged ZSM-5-type zeolite, copper ions that are nitrogen active sites have higher reaction activity with moisture than nitrogen and are oxidized by moisture to form copper hydroxide and become inactive to nitrogen. A maximum nitrogen adsorption amount of the vacuum insulation material at an equilibrium pressure of 10 Pa is about 0.238 mol/kg (5.33 cc-STP/g).

A vacuum insulation material may be used wherein a moisture adsorbing material covers a ZSM-5-type zeolite including exchanged copper ions to avoid effects caused by moisture. However, the ZSM-5-type zeolite including exchanged copper ions and a ratio of silica relative to alumina of greater than or equal to 8 and less than or equal to 25 has a relatively large adsorption rate for moisture. Accordingly, there are problems that when the ZSM-5-type zeolite is covered by a moisture adsorbing material under an inert gas, it may be inactivated by a trace amount of moisture in the inert gas.

SUMMARY

An adsorbing material may need to be vacuum-sealed in a metal vessel during a preparation process of a vacuum insulation material under an air atmosphere. Such sealing process while vacuum heating is relatively complicated and simultaneously results in a relatively large energy cost. Particularly, when the adsorbing material is injected, cautious handling of a sealant is needed until placing the vacuum insulation material due to an adsorption reaction rate and thus production cost may be disadvantageously affected.

A gas-adsorbing material may have a lowered adsorption rate in order to reduce inactivation during vacuum sealing under an air atmosphere and thus becomes easier to handle. The gas-adsorbing material may utilize nitrogen adsorption performance in a vacuum insulation material, and a vacuum insulation material may use the gas-adsorbing material.

The inventors have studied the relationship between gas adsorption performance and dealuminization of zeolite, and found that it is possible to enhance gas adsorption performance by dealuminization of zeolite.

Accordingly, one embodiment relates to a gas-adsorbing material having enhanced gas adsorption capacity. In one embodiment, a gas-adsorbing material having adsorption performance for a target gas and capable of adsorbing at least nitrogen may include a gas-adsorbing composition including a copper ion exchanged ZSM-5-type zeolite where a ratio of silica relative to alumina of greater than or equal to about 10 and less than or equal to about 50 in a zeolite framework, and a ratio of dealuminization of greater than or equal to about 15%.

In another embodiment, a gas-adsorbing material having adsorption performance for a target gas may include a calcinated body of a compressed article including a gas-adsorbing composition and a moisture-absorbing material coating the gas-adsorbing composition. The gas-adsorbing composition may include a copper ion exchanged ZSM-5-type zeolite as a gas-adsorbing material having adsorption performance for the target gas, wherein a ratio of silica relative to alumina in the zeolite framework is greater than or equal to about 10 and less than or equal to about 50, and a ratio of dealuminization of the zeolite is greater than or equal to about 15%.

In the gas-adsorbing material, greater than or equal to about 3 weight % and less than or equal to about 6.4 weight % of copper ion is exchanged and present in the ZSM-5-type zeolite.

The calcinated body may be a product prepared by vacuum calcinating the gas-adsorbing composition and the moisture-absorbing material.

A solid density of the calcinated body of the compressed article including the gas-adsorbing composition and the moisture-absorbing material after vacuum-calcination may be greater than or equal to about 2 g/cm$^3$ and less than or equal to about 2.0 g/cm$^3$.

BET specific surface are of the moisture-absorbing material comprised of the calcinated body may be greater than or equal to about 10 m$^2$/g, and the second particulate diameter may be less than or equal to about 100 μm.

The gas-adsorbing material may be prepared by coating the gas-adsorbing composition with a moisture-absorbing material, and disposing the moisture-absorbing material in a region exposed to a gas in a gas-adsorption surface for a target gas of the gas-adsorbing composition.

The gas-adsorbing material may have a gas-adsorption rate for a target gas of greater than or equal to about 0.005 cc/min and less than or equal to about 0.1 cc/min.

In the embodiment, the target gas may include at least nitrogen gas.

In another embodiment, a vacuum insulation material may include the gas-adsorbing material and exhibit insulation effects by causing its internal environment to be under a reduced pressure and by being in a thermal conductive region.

The vacuum insulation material may be used in an environment where a target gas concentration therein needs to be reduced.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

In one embodiment, a gas-adsorbing material having adsorption performance for a target gas and capable of adsorbing at least nitrogen may include a gas-adsorbing composition including a copper ion exchanged ZSM-5-type zeolite where a ratio of silica relative to alumina of greater than or equal to about 10 and less than or equal to about 50 in a zeolite framework, and a ratio of dealuminization of greater than or equal to about 15%.

The gas-adsorbing material may have good gas-adsorption capacity by including the gas-adsorbing composition.

In another embodiment, the gas-adsorbing material may include a calcinated body of the gas-adsorbing composition and a moisture-adsorbing material.

In the gas-adsorbing composition, a ratio of dealuminization of the copper ion exchanged ZSM-5-type zeolite (hereinafter, 'copper ion exchanged ZSM-5-type zeolite' may be simply referred to as 'zeolite') may be greater than or equal to about 15%. Accordingly, the gas-adsorbing material may increase adsorption capacity for a target gas, such as, nitrogen, carbon oxide, etc., regardless of the amount of copper supported therein. Therefore, according to the embodiment, amount of copper to be used may be reduced.

When the ratio of dealuminization of a gas-adsorbing material is less than 15%, gas-adsorption capacity may reduce, whereby the insulation effect of a vacuum insulation material including the gas-adsorbing material may not be good.

In the context of the specification, the 'ratio of dealuminization' indicates the value calculated by dividing the difference of numbers of atoms of aluminium present in the zeolite between before and after calcination by the number of atoms of aluminium before calcination, with respect to the number of atoms of aluminum of copper ion exchanged ZSM-5-type zeolite.

In the above embodiment, the method of adjusting the ratio of dealuminization of zeolites is not limited, as long as the ratio of dealuminization of the zeolite is greater than or equal to about 15%. The adjusting process may also be performed at any step during the process of fabricating the gas-adsorbing material.

An example method of dealuminization process may include a vacuum-calcination of precursors of a gas-adsorbing composition including zeolite.

As an exemplary condition for adjusting a predetermined ratio of dealuminization may include a ratio of silica relative to aluminium, a condition for calcination, etc.

In the embodiment, the ratio of dealuminization may be determined by combining the conditions exemplified above.

As an inspection of the relationship between the ratio of dealuminization and gas-adsorption capacity, we believe that the unstable zeolite framework is prone to adsorb a target gas to be in a stable state.

The gas-adsorbing composition will later be described again in more detail.

Hereinafter, various example embodiments will be described in further detail with reference to the drawings.

A gas-adsorbing material according to one example embodiment is a nitrogen adsorbing material. The nitrogen adsorbing material may be used for removing a nitrogen gas in a vacuum insulation material, but its use is not particularly limited.

The vacuum insulation material may cover a core material having micropores (such as glass wool or silica powder) with an exterior material having gas barrier properties so as to seal the inside of the exterior material under a reduced pressure. The vacuum insulation material may be used for a freezer, a refrigerator, a hot water supply, a heat insulating material for an automobile, a building, a vending machine, a cold reserving box, a thermostat, a cold-reserving car, and the like.

Figure 1:
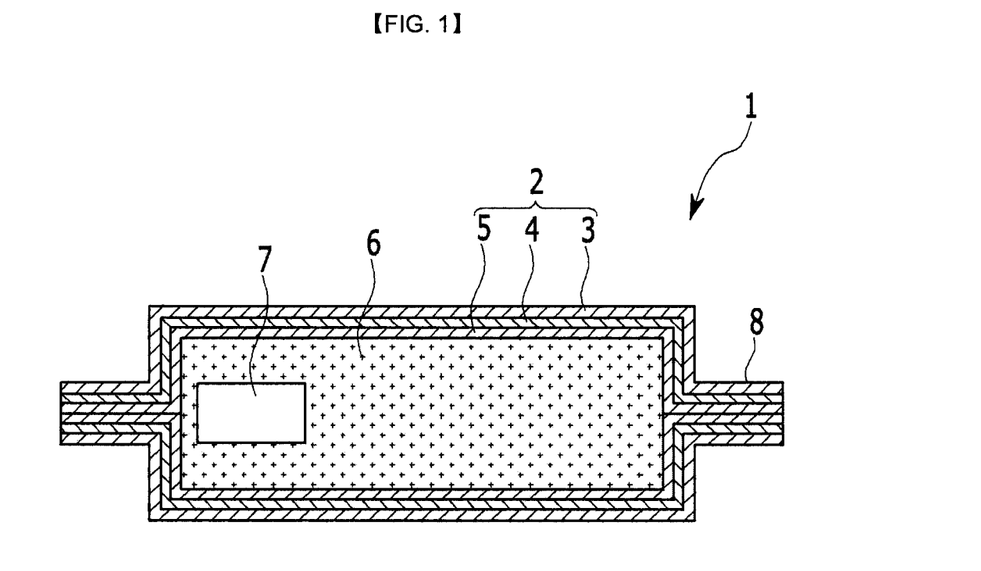
FIG. 1 is a schematic cross-sectional view showing an example embodiment of a vacuum insulation material.

FIG. 1 is a schematic cross-sectional view showing an example embodiment of a vacuum insulation material 1. As shown in FIG. 1, the vacuum insulation material 1 may be prepared by inserting a core material 6 and a gas-adsorbing material 7 between two sheets of an exterior material 2, and then closing and sealing the exterior material 2.

The two sheets of the exterior material 2 may be shaped as a bag with one open end and sealing (for example, heat-sealing) the sides. The opening is sealed after inserting the core material 6 and the gas-adsorbing material 7 in the bag and reducing its internal pressure. The sealing may be performed by heat seal. Reference numeral 8 represents a bonding part where the opening is sealed. Alternatively, it should be understood that the exterior material 2 may be in the form of a single sheet that is folded and sealed to form the bag.

Hereinafter, each member of the vacuum insulation material 1 will be discussed in further detail. According to an example embodiment, the exterior material 2 may be any material having gas barrier properties and capable of suppressing gas permeation. The exterior material 2 may be provided with gas barrier properties by laminating a plastic film formed of a thermoplastic resin, a metal foil, or the like. The exterior material 2 plays a role of isolating the core material 6 from air and/or moisture.

As shown in FIG. 1, a laminate film used for the exterior material 2 has a thermally-bonding layer (a thermal bonding film) 5 as an innermost layer, a metal foil or a metal deposition layer of a gas barrier layer (a gas barrier film) 4 as a middle layer, and a surface protection layer (a surface protection film) 3 as an outermost layer.

The thermal bonding film 5 may be obtained by melting the thermal bonding layer of the exterior material 2 with heat and pressure and solidifying the molten layer. The thermal bonding film 5 plays a role in maintaining the exterior material 2 with a predetermined or desired shape. In addition, the thermal bonding film 5 plays a role in suppressing permeation of gas (e.g., aqueous vapor) into the vacuum insulation material 1 from the end of the exterior material 2.

The thermal bonding film 5 is not particularly limited as long as it may be adhered by a general sealing method (for example, a heat sealing method). A material constituting the thermal bonding film 5 may be, for example, a polyolefin such as low-density polyethylene, linear low-density polyethylene, high-density polyethylene, and polypropylene, a thermoplastic resin such as an ethylene-vinyl acetate copolymer, an ethylene-methacrylic acid copolymer, an ethylene-acrylate ester copolymer, an ethylene-acrylate ester copolymer, and polyacrylonitrile. The materials may be used individually or as a mixture of two or more kinds thereof. The thermal bonding film 5 may be a single layer or a laminate of two or more layers. In the case of the latter, each layer may have the same composition or different compositions.

A thickness of the thermal bonding film 5 is not particularly limited. For example, the thermal bonding film 5 may have a thickness of about 10 μm to about 100 μm. When thinner than about 10 μm, the contact strength of the thermal bonding film 5 may be insufficient on the heat seal. On the other hand, when thicker than about 100 μm, the workability (such as bending properties) of the thermal bonding film 5 may be deteriorated. Furthermore, when the thermal bonding film 5 has a laminate structure of two or more layers, the thickness of the thermal bonding film 5 means the sum of the thicknesses. The individual thickness of each layer may be the same or different.

The gas barrier film 4 may include a metal foil (such as an aluminum foil, a copper foil, or the like), a polyethylene terephthalate film, a film obtained by depositing metal atoms (such as aluminum, copper, or the like), or a metal oxide (such as alumina, silica, or the like) on an ethylene-vinyl alcohol copolymer and the like without a particular limit. A thickness of the gas barrier film 4 is not particularly limited.

The material used to form the surface protection film 3 is not particularly limited. The material constituting the surface protection film 3 may be, for example, a polyamide (nylon) (PA) such as nylon-6, nylon-66, and the like, a polyester such as polyethylene terephthalate (PET), polyethylene naphthalate (PEN), polybutylene terephthalate (PBT), and the like, a polyolefin such as polyethylene (PE), polypropylene (PP), polystyrene (PS), and the like, polyimide, polyacrylate, polyvinyl chloride (PVC), polyvinylidenechloride (PVDC), an ethylene vinyl alcohol copolymer (EVOH), a polyvinyl alcohol resin (PVA), polycarbonate (PC), polyether sulfone (PES), polymethylmethacrylate (PMMA), a polyacrylonitrile resin (PAN), and the like.

A thickness of the surface protection film 3 is not particularly limited. For example, the surface protection film 3 may have a thickness of about 10 μm to about 100 μm. When less than or equal to about 10 μm, the protection of the gas barrier film 4 may not be sufficient. When thicker than about 100 μm, the workability (such as bending properties) of the surface protection film 3 may be deteriorated as in the thermal bonding film 5. Furthermore, when the surface protection film 3 has a laminate structure of two or more layers, the thickness means the total thickness. The individual thickness of each layer may be the same or different.

The films of the exterior material 2 may include several additives (e.g., stabilizers), for example, an antistatic agent, an ultraviolet (UV) blocking agent, a plasticizer, a lubricant, or the like. On the other hand, the additives may be used individually or as a mixture of greater than or equal to two kinds thereof. Furthermore, the surface protection film 3 may be a single layer or a laminate of two or more layers. In the latter case, each layer may have the same composition or different compositions.

The exterior material 2 has a thickness without a particular limit. For example, the thickness may be in a range of about 1 μm to about 100 μm. An exterior material 2 having such a thickness may more efficiently suppress and prevent a heat bridge and thus improve insulation performance, and also show improved gas barrier properties and workability.

In addition, the exterior material 2 including a gas barrier film 4 may have at least two sides of a laminate film disposed with a metal foil and with no metal foil, and the side of the laminate film disposed with no metal foil has at least either one film layer formed of an ethylene-vinyl alcohol copolymer resin composition and deposited with aluminum at the inner side, or is formed of a polyethylene terephthalate resin composition and deposited with aluminum at the inner side.

In addition, the exterior material 2 may not be the laminate film, but for example, may be a metal container, a glass container, or a gas barrier container formed by laminating resin and a metal. Such a plastic laminate film container may be obtained by laminating one or more selected from polyvinylidene chloride, polyvinyl alcohol, polyester, polypropylene, polyamide, polyethylene, a metal deposition film, and the like.

As shown in FIG. 1, the core material 6 is disposed inside of the exterior material 2. The core material 6 plays a role of framework of the vacuum insulation material 1, and forms a vacuum space. Herein, the core material 6 may be a known material without a particular limit. For example, material of the core material 6 may be an inorganic fiber such as glass wool, rock wool, an alumina fiber, a metal fiber formed of a metal with low thermal conductivity, and the like; an organic fiber such as a synthetic fiber such as polyester or polyamide, acrylic, polyolefin, aramid, and the like; cellulose manufactured from wood pulp; a natural fiber such as cotton, linen, wool, silk, and the like; a recycling fiber such as rayon, a semisynthetic fiber such as acetate; and the like.

Material of the core material 6 may be made of one type of material or a mixture of two or more types of materials. For example, glass wool from the above materials may be used. The core material formed of these materials has a relatively high elasticity and low thermal conductivity in the fibers, and is industrially inexpensive.

Figure 2:
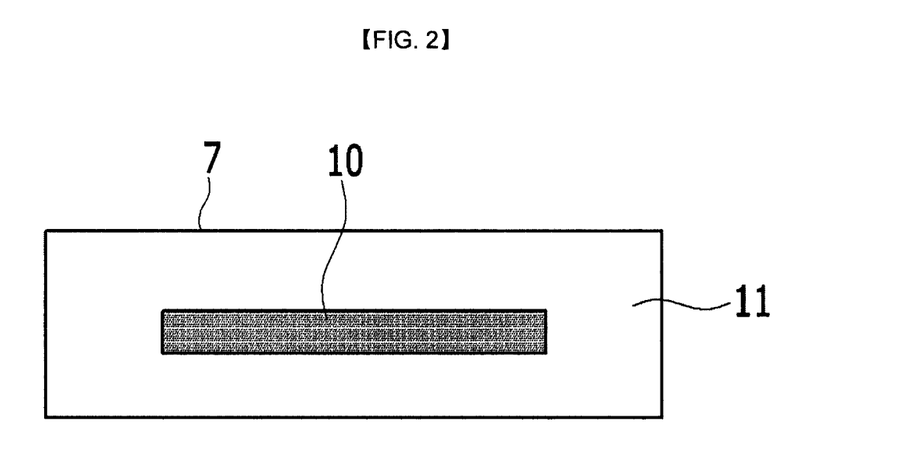
FIG. 2 is a diagram showing a structure of the gas-adsorbing material of FIG. 1.
Figure 3:
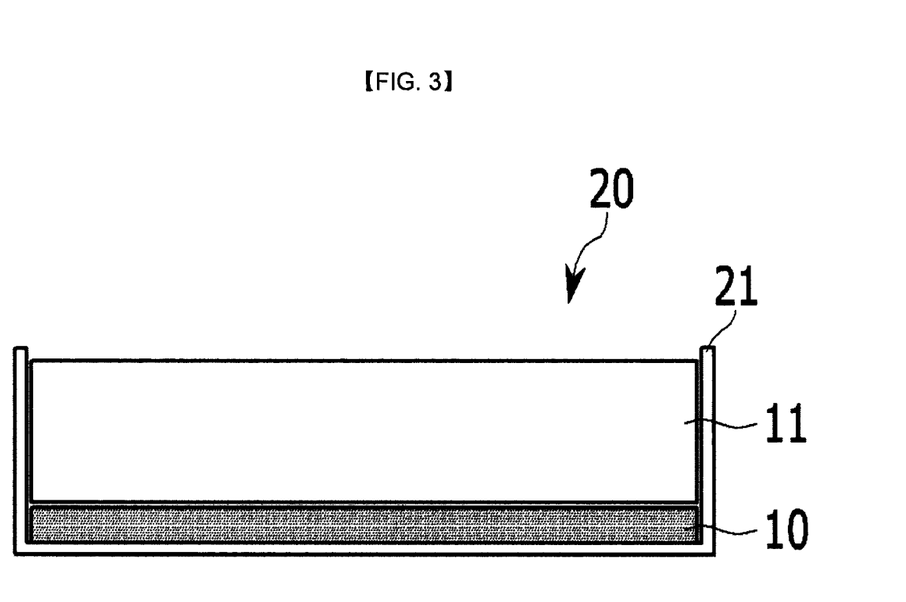
FIG. 3 is a diagram showing another example embodiment of a gas-adsorbing material.

The gas-adsorbing material 7 of FIG. 1, as shown in FIG. 2 and FIG. 3. FIG. 3 examplifies a structure in which a compression-shaped article obtained by coating the copper ion exchanged ZSM-5-type zeolite 10 with a moisture-adsorbing material 11 is stored in a hard case having a gas-permeable opening. The gas-adsorbing composition may adsorb a target gas that arrives permeating through the exterior material. A gas-adsorbing material may be formed by coating the gas-adsorbing composition with a moisture-absorbing material, and an adsorption surface for a target gas of the gas-adsorbing composition may correspond to an interface between the gas-adsorbing composition and the moisture-absorbing material. In FIG. 3, the opening on top of the hard case corresponds to a gas-permeable opening. The compression-shaped article may be formed as a granule- or pellet-shaped mass, and a plurality of the masses may be dispersed in the core material.

As another example of a gas-adsorbing material, a gas-permeable film may be used instead of the hard case. Further, instead of laminating the gas-adsorbing material and moisture-adsorbing material as in FIG. 3, the gas-adsorbing material may be prepared by forming a moisture-absorbing material layer around the gas-adsorbing composition.

The copper ion exchanged ZSM-5-type zeolite 10 that is a main body of a gas-adsorbing material consists of a porous crystalline aluminosilicate, and is formed by copper ion exchanged ZSM-5-type zeolite where a ratio of silica relative to alumina (Si/Al) of a zeolite framework is greater than or equal to about 10 and less than or equal to about 50. In one example embodiment, a calcinated body including the zeolite may have a ratio of dealuminization of greater than or equal to about 15%.

In the copper ion exchanged ZSM-5-type zeolite 10 to be used in an example embodiment may have a ratio of silica relative to alumina of greater than or equal to about 10 and less than or equal to about 50 in a zeolite framework.

ZSM-5-type zeolite that is a raw material for copper ion exchange may be a commercially available material. When the ratio of silica relative to alumina exceeds 50, a copper ion exchange amount becomes smaller and adsorption amounts of a trace amount of impurities becomes smaller. On the other hand, it is hard to obtain ZSM-5-type zeolite in which the ratio of silica relative to alumina is less than 10.

In the copper ion exchanged ZSM-5-type zeolite 10, the ratio of the copper ion exchange may be greater than or equal to about 40% of the ion exchangeable amount of each zeolite. An ion exchanged copper ion may be a specific adsorption factor for nitrogen and carbon monoxide. When the copper ion exchange ratio is too small, specific adsorption performance does not exhibit.

A method of ion exchanging sodium of ZSM-5-type zeolite with copper is not particularly limited, and may be a conventional well-known method. For example, ZSM-5-type zeolite is dipped in an aqueous solution of soluble salts (nitrate, acetate, oxalate, hydrochloride, etc.) of copper and thereby sodium may be ion exchanged with copper. Herein, a desirable amount of copper ion exchange may be adjusted by selecting a concentration of the copper salt, a dipping time, a dipping temperature, the number of dippings.

After ion exchange, water is used for washing, and after drying, it is calcinated at an appropriate temperature to obtain a useable product. Herein, a drying temperature may be about 100° C., and a calcinating temperature may be greater than or equal to about 350° C., for example about 500° C. to about 800° C., under a nitrogen gas atmosphere.

Since specific adsorption performance of the adsorbing material exhibits according to existence of a monovalent copper ion, changes from a divalent copper ion to a monovalent copper ion are not sufficient at a calcinating temperature of less than about 500° C., and thus it is difficult to show sufficient adsorption performance, while at a temperature of greater than or equal to about 800° C., a structure of the zeolite may be fractured.

An amount of the copper ion of the copper ion exchanged zeolite may be greater than or equal to about 3 wt % and less than or equal to about 6.4 wt %. The weight may be measured by any method, for example, an ICP light emitting analysis method (inductive charge light emitting analysis method).

The ion exchange ratio may be obtained based on the hypothesis that one copper ion is exchanged with two sodium ions. That is to say, at ion exchange, it is based on the hypothesis that the copper ion exists as a divalent ion. Actually, since the copper ion may exist as a monovalent ion, an exchange ratio of greater than or equal to about 100% may be obtained as a calculation value, and the calculation value reaches an upper ion exchange ratio limit of 200% when all the copper ions are monovalent.

When the copper ion exchanged ZSM-5-type zeolite 10 is included in the gas-adsorbing material 7, the gas-adsorbing material 7 efficiently adsorbs and removes impurities present in a very small amount in an inert gas, oxygen, hydrogen, carbon dioxide, hydrocarbon, and sulfur hexafluoride gas, for example, carbon monoxide, ammonia, nitrogen trifluoride, carbon dioxide, methane, hydrogen, and oxygen, and reduces the amount of the impurities in the gas down to an amount of about 1 ppm, that is, purity of greater than or equal to about 99.9999 volume %, and thus purifies the gas.

The gas-adsorbing material 7 is a calcinated body of a gas-adsorbing composition and a moisture-absorbing material. As for the gas-adsorbing composition comprised of the calcinated body, a copper ion exchanged ZSM-5-type zeolite may be used. In the calcinated body, a ratio of dealuminization of the zeolite may be greater than or equal to about 15%, for example, greater than or equal to about 17%. As the ratio of dealuminization increases, gas-adsorption capacity tends to increase. When the ratio of dealuminization is less than 15%, it is difficult to obtain a significant increase of gas-adsorption capacity. The reason may be that the zeolite framework is not unstable enough to adsorb a target gas when the ratio of dealuminization is low.

Further, the ratio of silica relative to alumina may be greater than or equal to about 10 and less than or equal to about 50.

In addition, the gas-adsorbing material may include a gas-adsorbing composition including a copper ion exchanged ZSM-5-type zeolite, where the ratio of silica relative to alumina is greater than or equal to about 10 and less than or equal to about 50 in the zeolite framework, and the ratio of dealuminization of the zeolite is greater than or equal to about 15%, instead of the calcinated body. In this case, the gas-adsorbing material may be a gas-adsorbing composition itself, and does not include a moisture-absorbing material. This type of the gas-adsorbing material can also enhance gas-adsorption capacity. However, any type of the gas-adsorbing material may also include inevitable impurities.

The gas-adsorbing material according to an embodiment includes at least a gas-adsorbing composition. Alternatively, the gas-adsorbing material may include a gas-adsorbing composition and a moisture-absorbing material, and may be, for example, a calcinated body of a compressed article including a copper ion exchanged ZSM-5-type zeolite and a moisture-absorbing material. This compressed-calcinated body increases solid density of a moisture-absorbing material 11, for example, a calcium oxide layer and suppresses permeability of nitrogen. That is, the compressed-calcinated body may improve gas barrier properties.

The inventors have confirmed that the calcinated body may have a nitrogen adsorption rate reduced down to less than or equal to about $\frac{1}{10}$, compared with that of a conventional nitrogen adsorption powder (before vacuum-calcinating). Specifically, the solid density of the calcinated body may be adjusted to have the target gas adsorption rate in a range of greater than or equal to about 0.005 cc/min to less than or equal to about 0.1 cc/min.

When the target gas adsorption rate is less than about 0.005 cc/min, desired gas-adsorption performance may not be obtained, while when the target gas adsorption rate is greater than about 0.1 cc/min, gas-adsorption performance may be inactivated early. For example, the target gas adsorption rate may be in a range of greater than or equal to about 0.008 cc/min and less and equal to about 0.05 cc/min, and for example, greater than or equal to about 0.01 cc/min and less and equal to about 0.02 cc/min.

In addition, nitrogen remaining in a vacuum insulation material or continuously passing an exterior material may be sufficiently adsorbed by vacuum-calcinating and dealuminizing greater than or equal to about 15% of aluminum in a copper ion exchanged ZSM-5-type zeolite-shaped article as well as reducing a nitrogen adsorption rate.

Further, in a gas-adsorbing material according to an embodiment, a gas-adsorbing composition itself, which includes a zeolite having a ratio of dealuminization of greater than or equal to about 15%, may exhibit an effect of improving gas-adsorption capacity.

Herein, the dealuminization indicates a phenomenon in which a ratio of silica relative to alumina before calcinating becomes higher as the alumina (Al) is reduced due to vacuum calcinating. ZSM-5-type zeolite is known to adsorb nitrogen by oxygen tridentated copper monovalent sites.

According to one example embodiment, dealuminization of the zeolite comprised of the calcinated body has been performed until the ratio of dealuminization reaches 15%, whereby the adsorption capacity for a target gas, such as nitrogen, has been improved. Further, according to one example embodiment, structural instability due to the dealuminization of the ZSM-5-type zeolite may also be related to the content of copper.

According to another embodiment, a process of calcinating at least a gas-adsorbing composition is provided.

According to still another embodiment, a process of fabricating a gas-adsorbing material including a gas-adsorbing composition and a moisture-absorption material includes calcinating at least an article including a gas-adsorbing composition and a moisture-absorption material. The process may further include a vacuum-calcination process.

A surface of the gas-adsorbing composition, for example, a region to be exposed to a target gas in an adsorption surface for a target gas may be completely coated with a moisture-absorption material, and, for example, at least 99.9% of a surface area of the gas-adsorbing composition may be coated with a moisture-absorption material. When the coated area is less than 99%, gas-adsorbing composition is easy to contact with moisture. In this case, the zeolite contained in the gas-adsorbing composition reacts with moisture, and the adsorption performance for a target gas may be deteriorated.

The article may be compressed before being calcinated, such that a solid density of the article reaches greater than or equal to about 1.2 g/cm$^3$ and less than or equal to about 2.0 g/cm$^3$. Compression may be performed by using a known pressurization method. By adjusting the solid density as above, target gas may be sufficiently contacted with the gas-adsorbing composition, and a desired adsorption performance may be achieved. A solid density of an article after vacuum-calcination is the same as that of an article before vacuum-calcination.

Calcination may be performed under an inactive atmosphere, as well as under vacuum. In a view of adjusting a predetermined ratio of dealuminiazation, vacuum-calcination may be used.

On the other hand, the [vacuum-calcinating] described hereinafter in examples and comparative examples is performed at about 550° C. to about 650° C. for about 3 hours with a pressure of less than or equal to about 10 Pa to about 2 Pa by using an oil diffusion pump. A calcinated body may be left to cool to room temperature. A gas-adsorbing material including a gas-adsorbing composition, or a gas-adsorbing material including a calcinated body including a gas-adsorbing composition and a moisture-absorbing material may be obtained by using the above calcination process.

When target gas is nitrogen, the gas-adsorption performance of the gas-adsorbing material according to an example embodiment may be at fastest less than or equal to about 0.02 cc/min as an adsorption rate, and at least greater than or equal to about 1.0 cc/g as an adsorption capacity. Adsorption capacity may be determined based on ASTM F798-97 by using a constant volume gas-adsorption method. Particularly, after putting a nitrogen-adsorbing composition in a sample room, valve is opened by using a vacuum pump, and the gas-storage and sample room is adjusted vacuum to less than or equal to about 0.01 Pa and the valve is closed. Then, the valve is opened, and the nitrogen gas is introduced into the gas-storage by opening valve until a predetermined pressure is achieved. Then, the gas-supplying valve is closed, valve is opened, the sample room is introduced with nitrogen gas, and change of pressure of the nitrogen gas is measured with a pressure-measuring gauge to determine gas-adsorption capacity.

Further, the gas-adsorbing material including a gas-adsorbing composition including a copper ion exchanged ZSM-5-type zeolite, where a ratio of silica relative to alumina of greater than or equal to about 10 and less than or equal to about 50 in the zeolite framework, and a ratio of dealuminization of greater than or equal to about 15%, exhibits good nitrogen-adsorption performance without including a moisture-absorbing material.

The vacuum insulation material according to an embodiment may be fabricated by a process including disposing a gas-adsorbing material including a gas-adsorbing composition and a moisture-absorbing material into an inside of an exterior material, reducing pressure inside the exterior material, and vacuum-sealing the same. In addition to the gas-adsorbing material, a core material may also be included in the inside of the exterior material. In an example embodiment, the vacuum insulation material may be used in a thermal conductive region with the interior environment in which the vacuum insulation material is disposed under vacuum. The insulation effect of the vacuum insulation material according to an embodiment may be analyzed with the thermal conductive ratio and change thereof depending on time. According to an embodiment, reduction rate of the thermal conductive ratio is low.

EXAMPLES

Example 1

An article having solid density of 1.4 g/cm³ is manufactured by localizing copper ion-exchanged ZSM-5-type zeolite (Tosoh Co.) having a ratio of silica relative to alumina of 20.3 and copper-supported in an amount of 3.12 wt % in a part of a moisture-absorbing material having a BET specific surface area of 3 m²/g and a secondary particle diameter of 100 µm, and compressing and molding a product therefrom at 120 kgf/cm². Then, the article is vacuum calcinated to obtain a gas-adsorbing material according to Example 1.

When the nitrogen adsorption rate of the article according to Example 1 is measured, the result is 0.02 cc/min.

In addition, after the calcinating, the article has a dealuminization ratio of ratio of 15.8%.

The article has an adsorption capacity of 3.5 cc/gram.

The adsorption rate in each example and comparative example is measured according to a method of ASTM F798-97.

Example 2

Ion exchanged ZSM-5-type zeolite (Sud-Chemie Inc.) having a ratio of silica relative to alumina of 47.4 is ion exchanged with a nitric acid copper solution to be copper-supported in an amount of 2.95 wt %, and then vacuum-dried at room temperature. The obtained copper ion exchanged ZSM-5-type zeolite is localized in a part of a moisture-absorbing material having a BET specific surface area of 10 m²/g and a secondary particle diameter of 100 µm, compressing and molding a product thereof at 100 kgf/cm². Then, the article is vacuum-calcinated to manufacture an article according to Example 2 having solid density of 1.2 g/cm³.

When the nitrogen adsorption rate of the article according to Example 2 is measured, the result is 0.02 cc/min.

In addition, after the calcinating, the article has a dealuminization ratio of 17.8%.

The article has an adsorption capacity of 2.8 cc/gram.

Example 3

Ion exchanged ZSM-5-type zeolite (Tosoh Co.) having a ratio of silica relative to alumina of 11.5 is ion exchanged with a copper acetate solution to be copper-supported in an amount of 5.8 wt % and vacuum-dried at room temperature. Subsequently, the obtained copper ion exchanged ZSM-5-type zeolite is localized in a part of a moisture-absorbing material having a BET specific surface area of 20 m²/g and a secondary particle diameter of 10 µm, and compressed and shaped at 290 kgf/cm² to manufacture an article having solid density of 2.0 g/cm3. Then, the article is vacuum calcinated to obtain a gas-adsorbing material according to Example 3.

When the nitrogen adsorption performance of the article according to Example 3 is measured, the result is 0.01 cc/min.

In addition, after the calcinating, the article has a dealuminization ratio of 36.0%.

The article has an adsorption capacity of 6.5 cc/gram.

Example 4

Ion exchanged ZSM-5-type zeolite (Tosoh Co.) having a ratio of silica relative to alumina of 11.5 is ion exchanged with a copper acetate solution to copper supported in an amount of 6.4 wt %, and then vacuum-dried at room temperature. Subsequently, the obtained copper ion exchanged ZSM-5-type zeolite is localized in a part of a moisture-absorbing material having a BET specific surface area of 20 m²/g and a secondary particle diameter of 10 µm, and compressed and shaped at 140 kgf/cm² to manufacture an article having solid density of 1.5 g/cm³. Then, the article is vacuum calcinated to obtain a gas-adsorbing material according to Example 4.

When the nitrogen adsorption performance of the article according to Example 4 is measured, the result is 0.020 cc/min.

In addition, after the calcinating, the article has a dealuminization ratio of 58.6%.

The article has an adsorption capacity of 7.5 cc/gram.

Comparative Example 1

Copper ion exchanged ZSM-5-type zeolite (Tosoh Co.) having a ratio of silica relative to alumina of 20.3 and copper-supported in an amount of 3.12 wt % is mixed with a moisture-absorbing material having a BET specific surface area of 3 m²/g and a secondary particle diameter of 100 μm, and the mixture is covered and vacuum-calcinated at 600° C. to obtain a gas-adsorbing material according to Comparative Example 1.

When the nitrogen adsorption rate of the vacuum-calcinated product according to Comparative Example 1 is measured, the result is 0.21 cc/min.

In addition, after the vacuum-calcination, the article has a dealuminization ratio of 11.3%.

The article has an adsorption capacity of 2.8 cc/gram.

Comparative Example 2

Ion exchanged ZSM-5 (Sud-Chemie Inc.) having a ratio of silica relative to alumina of 47.4 is ion exchanged with a copper nitrate solution to be copper-supported in an amount of 2.95 wt %, and then vacuum-dried at room temperature. Then, the obtained copper ion exchanged ZSM-5 is mixed with a moisture adsorbing material having a BET specific surface area of 20 m²/g and a secondary particle diameter of 10 μm, and the mixture is covered and vacuum-calcinated at 600° C. to obtain a gas-adsorbing material according to Comparative Example 2.

When the nitrogen adsorption rate of the vacuum-dried product according to Comparative Example 2 is measured, the result is 0.22 cc/min.

In addition, after the vacuum-calcination, the article has a dealuminization ratio of 13.3%.

The article has an adsorption capacity of 1.9 cc/gram.

The results obtained in Examples 1 to 4 and Comparative Examples 1 and 2 are described in Table 1 below.

In Table 1, solid density is not measured for the samples described as "mixture".

As shown in Table 1 below, Examples 1 to 4, where the gas-adsorbing materials are obtained by vacuum-calcinating the copper ion exchanged ZSM-5-type zeolite compressed and molded in a state covered with the moisture-absorbing material, show a nitrogen adsorption rate reduced down to less than or equal to 1/10 thereof compared with Comparative Examples 1 and 2.

Further, while all the ratios of dealuminization in Examples 1 to 4 are greater than or equal to 15%, those in Comparative Examples 1 and 2 are less than 15%.

TABLE 1

| | | Example 1 | Example 2 | Example 3 | Example 4 | Comparative Example 1 | Comparative Example 2 |
|---|---|---|---|---|---|---|---|
| ZSM-5-type zeolite | Ratio of Si/Al | 20.3 | 47.4 | 11.5 | 20.3 | 47.4 | 11.5 |
| | Amount of copper supported (wt %) | 3.12 | 2.95 | 5.8 | 3.12 | 2.95 | 6.4 |
| Moisture-absorbing material | BET specific surface area (m²/g) | 3 | 10 | 20 | 3 | 20 | 20 |
| | Second particulate diameter (μm) | 100 | 100 | 10 | 100 | 10 | 10 |
| Solid density (g/cm³) | | 1.4 | 1.2 | 2.0 | 1.5 | mixture | mixture |
| Nitrogen-adsorption rate (cc/min) | | 0.02 | 0.02 | 0.01 | 0.02 | 0.21 | 0.22 |
| Nitrogen-adsorption capacity (cc/g) | | 3.5 | 2.8 | 6.5 | 7.5 | 2.8 | 1.9 |
| Ratio of dealuminization (%) | | 15.8 | 17.8 | 36.0 | 58.6 | 11.3 | 13.3 |

Example 5

Copper ion exchanged ZSM-5-type zeolite (Tosoh Co.) having a ratio of silica relative to alumina of 20.3 and copper-supported in an amount of 3.12 wt %, as shown in FIG. 3, is laid at the bottom of a moisture-impermeable metal container 21, covered with a moisture-absorbing material 11 having a BET specific surface area of 10 m²/g and a secondary particle diameter of 10 μm, compressed and shaped at 120 kgf/cm², and vacuum-calcinated, manufacturing an article having solid density of 1.4 g/cm³. The article is then vacuum-calcinated to obtain a gas-adsorbing material 20.

This gas-adsorbing material and a glass fiber are inserted in an inside of an exterior material having gas barrier properties, and vacuum-sealed to, prepare a vacuum insulation material according to Example 5.

When the thermal conductivity of the gas-adsorbing material according to Example 5 is measured, the result is 2.29 mW/mK.

Comparative Example 3

Copper ion exchanged ZSM-5-type zeolite (Tosoh Co.) having a ratio of silica relative to alumina of 20.3 and copper-supported in an amount of 3.12 wt % is disposed in a metal container such that the surroundings of the copper ion exchanged ZSM-5-type zeolite is covered with a moisture-absorbing material having a BET specific surface area of 10 m$^2$/g and a secondary particle diameter of 10 μm, and then molded without compression. Then, the article is vacuum-calcinated to manufacture a gas-adsorbing material.

This gas-adsorbing material and a glass fiber are inserted in an inside of an exterior material having gas barrier properties, and then vacuum-sealed to manufacture a vacuum insulation material according to Comparative Example 3.

When the thermal conductivity of the vacuum insulation material according to Comparative Example 3 is measured, the result is 2.77 mW/mK.

Example 6

A vacuum insulation material according to Example 6 is prepared by inserting the gas-adsorbing material according to Example 1 and a glass fiber in an inside of an exterior material having gas barrier properties, and then vacuum-sealing them.

When the thermal conductivity of the vacuum insulation material according to Example 6 is measured, the result is 2.07 mW/mK.

Then, when an environment test regarding the vacuum insulation material according to Example 6 is performed at 30° C. under humidity of 95% for 1 month, the vacuum insulation material has thermal conductivity of 2.22 mW/mK.

Comparative Example 4

A vacuum insulation material according to Comparative Example 4 is prepared by inserting the gas-adsorbing material according to Comparative Example 1 and a glass fiber in an inside of an exterior material having gas barrier properties, and then vacuum-sealing them.

When the thermal conductivity of the vacuum insulation material according to Comparative Example 4 is measured, the result is 2.01 mW/mK.

Then, when an environment test is performed regarding the vacuum insulation material at 30° C. under humidity of 95% for 1 month, the vacuum insulation material has thermal conductivity of 4.07 mW/mK.

Since the copper ion exchanged ZSM-5-type zeolite is covered with the moisture-absorbing material without compression in Comparative Example 4, nitrogen-adsorption capability is reduced.

The vacuum insulation material of Comparative Example 4 shows almost equivalent initial thermal conductivity to that of Example 6, but large difference in the environment test result. The reason is that the gas barrier properties are improved by increasing solid density of the gas-adsorbing material through vacuum calcinating in a compression state in Example 6.

Example 7

Powder of copper ion exchanged ZSM-5-type zeolite (Tosoh Co.) having a ratio of silica relative to alumina of 20.3 and copper supported in an amount of 3.12 wt % is vacuum-calcinated to obtain a gas-adsorbing material according to Example 7.

The dealuminization ratio of the gas-adsorbing material according to Example 7 is 16.4%.

In addition, after nitrogen adsorption test, nitrogen adsorption capacity is 3.8 cc/g. Further, nitrogen adsorption rate is 0.25 cc/min.

Comparative Example 5

Iion exchanged ZSM-5-type zeolite (Tosoh Co.) having a ratio of silica relative to alumina of 11.5 is ion exchanged with a copper acetate solution to copper supported in an amount of 5.8 wt %, and then vacuum-dried at room temperature. Subsequently, the obtained copper ion exchanged ZSM-5-type zeolite is compressed at 290 kgf/cm$^2$, but it fails to maintain the same as an article.

Accordingly, a gas-adsorbing material according to the embodiment functions as, for example, a nitrogen adsorbing material among vacuum insulation materials, and maintains a desired vacuum degree in a heat insulating material. Further, the gas-adsorbing material has a predetermined ratio of dealuminization, thus it is possible to improve gas-adsorption capacity and reduce the amount of copper to be used, compared with the conventional gas-adsorption materials having equivalent amount of copper supported therein.

While various examples have been described herein, it should be understood that the application is not limited to the disclosed embodiments. Rather, the application is intended to cover various modifications and equivalent arrangements included within the spirit and scope of the appended claims.

The invention claimed is:

1. A gas-adsorbing material having an adsorption performance for a target gas, comprising:
    a vacuum calcinated body of a compressed article comprising a gas-adsorbing composition and a moisture-absorbing material, the gas-adsorbing composition including a copper ion exchanged ZSM-5-type zeolite having a ratio of silica relative to alumina ranging from about 10 to about 50 in a framework of zeolite,
    wherein a dealuminization of the ZSM-5-type zeolite being greater than or equal to about 15%, and
    wherein the gas-adsorbing material has a capability of adsorbing at least nitrogen.

2. The gas-adsorbing material of claim 1, wherein an adsorption rate for the target gas ranges from about 0.005 cc/min to about 0.1 cc/min.

3. The gas-adsorbing material of claim 1, wherein the target gas comprises at least nitrogen gas.

4. The gas-adsorbing material of claim 1, wherein a copper ion content of the copper ion exchanged ZSM-5-type zeolite ranges from about 3 wt % to about 6.4 wt %.

5. A gas-adsorbing material having an adsorption performance for a target gas, comprising:
    a vacuum calcinated body of a compressed article comprising a gas-adsorbing composition and a moisture-absorbing material, the gas-adsorbing composition including a copper ion exchanged ZSM-5-type zeolite having a ratio of silica relative to alumina ranging from about 10 to about 50 in a framework of zeolite;
    wherein a dealuminization of the SM-5 type zeolite in the calcinated body being greater than or equal to about 15%.

6. The gas-adsorbing material of claim 5, wherein a solid density of the vacuum-calcinated body of the compressed article comprising the gas-adsorbing composition and the moisture-absorbing material ranges from about 1.2 g/cm$^3$ to about 2.0 g/cm$^3$.

7. The gas-adsorbing material of claim 5, wherein the gas-adsorbing composition is coated with the moisture-absorbing material, and the moisture-absorbing material is disposed in a region exposed to a gas in an adsorption surface for a target gas of the gas-adsorbing composition.

8. The gas-adsorbing material of claim 5, wherein an adsorption rate for the target gas ranges from about 0.005 cc/min to about 0.1 cc/min.

9. The gas-adsorbing material of claim 5, wherein the target gas comprises at least nitrogen gas.

10. The gas-adsorbing material of claim 5, wherein a copper ion content of the copper ion exchanged ZSM-5-type zeolite ranges from about 3 wt % to about 6.4 wt %.

11. A vacuum insulation material exhibiting an insulating effect when placed in a thermally conductive region in an internal environment set under a reduced pressure, comprising:
a gas-adsorbing material according to claim 1.

12. A vacuum insulation material exhibiting an insulating effect when placed in a thermally conductive region in an internal environment set under a reduced pressure, comprising:
a gas-adsorbing material according to claim 5.

* * * * *